United States Patent [19]
Thompson

[11] 3,778,706
[45] Dec. 11, 1973

[54] DIELECTRIC CONSTANT MEASUREMENT METHOD

[75] Inventor: Don D. Thompson, Corona Del Mar, Calif.

[73] Assignee: Chevron Research Company, San Francisco, Calif.

[22] Filed: July 3, 1972

[21] Appl. No.: 268,286

Related U.S. Application Data

[63] Continuation-in-part of Ser. No. 50,022, June 26, 1970, Pat. No. 3,675,121.

[52] U.S. Cl. ............................................. 324/61 R
[51] Int. Cl. ........................................... G01r 27/26
[58] Field of Search .......................... 324/61 R, 61 P

[56] References Cited
UNITED STATES PATENTS
3,523,245   8/1970   Love et al. ...................... 324/61 R Primary Examiner—Alfred E. Smith
Attorney—J. A. Buchanan, Jr. et al.

[57] ABSTRACT

The real part of the complex dielectric constant of natural gas stream from a producing gas well can be accurately measured at the well head by avoiding even minute effects of dispersion and water absorption by driving the capacitance probe at a frequency in a range of 40 to 300 megahertz.

8 Claims, 12 Drawing Figures

DIELECTRIC CONSTANT MEASUREMENT METHOD

CROSS-REFERENCE TO RELATED APPLICATIONS

This application is a continuation-in-part of U.S. application Ser. No. 050,022, filed June 26, 1970, now U.S. Pat. No. 3,675,121.

This invention covers a new method for measuring the dielectric constant of a fluid medium which contains conducting impurities and water and, more particularly, covers a new method for measuring the dielectric constant of crude oils which contain conducting inorganic colloidal particles and water.

Various schemes and instruments have been utilized in the past to measure the dielectric constant of fluid media. The basic scheme, as disclosed by W. A. Bruce in U.S. Pat. No. 2,654,067, is to insert a capacitance probe into the fluid medium, measure the capacitance of the circuit and then determine the dielectric constant of the medium by dividing the measured capacitance by that obtained by the same probe in a vacuum. The basic scheme has been used in conjunction with specific gravity methods as disclosed, for example, in L. E. Thompson et al, U.S. Pat. No. 2,783,420, and L. E. Kuntz, U.S. Pat. No. 3,253,606. The basic scheme has also been used in conjunction with colorimetric methods as disclosed in J. R. Parsons, U.S. Pat. No. 2,859,757. Recent developments have involved the use of a very low frequency, R. B. McEuen, U. S. Pat. No. 3,394,308; the use of a dual frequency scheme, A, M. Norwich, U. S. Pat. No. 3,255,410; and the use of specific circuitry to minimize conductivity effects of the material undergoing measurement, H. G. Doll, U. S. Pat. No. 3,072,844.

It has long been a problem in accurately measuring dielectric constants of fluid media that the media themselves have an appreciable conductivity or that the media contain impurities which are highly conductive. Due to the conductance of impurities in the medium the current between the plates of the capacitance probe has a conduction current component as well as the regular displacement current component. The frequency dependence of this phenomenon is called dispersion and it has made it difficult to obtain a direct accurate measurement of the dielectric constant because the conduction current component affects the capacitance measured by the standard capacitance probe.

It has also been a problem in actually measuring dielectric constants of fluid media that polar molecules such as water, either as constituents of the media or as impurities, have absorbed some of the power of the measuring circuit. In the case of water, this phenomenon is called water dipole absorption. This loss of power in the measuring circuit has rendered test results inaccurate.

The dielectric constant is a complex function which consists of a real part and an imaginary part: $\epsilon = \epsilon' + i\epsilon''$. The real part, $\epsilon'$, is the component that is commonly referred to as the dielectric constant. The imaginary part, $\epsilon''$, is commonly called the loss factor. The real part $\epsilon'$ of the dielectric constant is due to the displacement current and would be the only component of the dielectric constant if an alternating electric current of infinite frequency was used to drive a standard capacitance probe because there would be no opportunity for a conductive current to flow in the medium and there would be no opportunity for polar water molecules to oscillate and occasion friction losses. The complex part of the dielectric constant is due to the conduction current and to water dipole absorption, i.e., to friction losses associated with the movement of polar water molecules which try to orient themselves with the alternating electric field established by the capacitance measuring circuit. The physical flow of current and the oscillation of polar molecules results in an energy loss in the measuring circuit and therefore limits the effectiveness of capacitance probe circuits by sapping their energy. The energy loss also distorts the measured capacitance data so that the measured dielectric constant is not the real part of the complex dielectric constant, the part that it is desirable to measure, since it is a specific quantity which can be used to identify the presence of a particular substance.

It is therefore an object of this invention to directly measure the real part of the dielectric constant of a fluid medium with an appreciable conductivity or which contains conducting impurities.

It is a further object of this invention to directly measure the dielectric constant of a fluid medium by making measurements which are relatively insensitive to any conduction current flowing in the dielectric medium.

An additional object is the measurement of the dielectric constant of a fluid medium with minimal interference from energy losses due to water dipole absorption.

The method of this invention comprises the operation of a capacitance probe in the fluid medium whose dielectric constant is to be measured at a frequency within the frequency range of 10 to 300 megahertz. The present inventor has found that the real part of the dielectric constant produces the predominant effect within this range. Conduction effects and water dipole absorption are minimal within this range so the imaginary portion of the complex dielectric function is a minimum.

The contribution to the imaginary part of the composite dielectric constant or the loss factor made by water dipole friction is shown in Table 1 (date taken from Dielectric Materials and Their Applications, A. Von Hippel, 3rd printing, 1961, p. 361) in which the ratio of the loss factor to the real part of the dielectric constant, tangent $\Delta$, is listed as a function of frequency.

TABLE I

| Frequency in megahertz | Tan $\Delta$ for T=1.g°C | Tan $\Delta$ for T=25°C | Tan $\Delta$ for T=85°C |
|---|---|---|---|
| 10 | 0.002 | 0.0046 | 0.0125 |
| 100 | 0.007 | 0.0050 | 0.003 |
| 300 | 0.032 | 0.016 | 0.0073 |
| 1,000 | 0.31 | 0.157 | 0.0547 |
| 10,000 | 1.03 | 0.54 | 0.26 |
| 25,000 | 0.42 | 0.265 | — |

Thus, it can be seen that the imaginary portion of the dielectric constant of water, that portion due to water dipole absorption, is insignificant for frequencies under 300 megahertz.

While a window of 10 megahertz to about 300 megahertz is suitable in order to avoid water dipole losses and spurious effects due to electrode polarization, the lower end of the window must be contracted to avoid conduction effects due to the presence of conducting impurities. The present inventor has carried out a number of experiments which have shown that ocnducting inorganic colloidal impurities have an appreciable effect on the dielectric constant measured for a water-in-oil emulsion when measurements are made at frequencies up to 30 or 40 megahertz. For example, a water cut meter operating at a frequency of 10 megahertz was used to measure the dielectric constants of several organic solvents which included trace amounts of a dry clay, montmorillonite. Correct dielectric constant measurements were made. Then when less than one percent water was added, to wet the clay, the measured dielectric constant was high by as much as 10 percent. The trace amounts of montmorillonite, when wetted, had a tremendous effect on the measured dielectric constant. The same experiment was conducted with other clays and similar effects were observed although they were not as pronounced.

The conduction effects of clay vary, but they have several common characteristics which enhance their ability to function as conductors. First, they will absorb water and therefore swell so that they have an appreciable surface area and can effectively function as carriers of electric charges, i.e., as conductors. Secondly, while clay particles exist in a variety of shapes, they have a tendency to be sheet-like or to have needle shapes. And it is known that sheet-like or needle shapes have the capability of serving as effectively oriented conductors. See R. W. Sillars, The Properties of a Dielectric Containing Conducting Particles of Various Shapes, Institute of Electrical Engineers Journal, v. 80, no. 484 (April, 1937), pp. 378-394. Thirdly, clays are largely composed of aluminum silicates which inherently are highly conductive materials. For these reasons, a concentration of clay particles in a fluid medium as small as the order of 0.001 percent can create a dispersion in the measured dielectric constant on the order of 10 percent. It is principally the physical state of the conducting impurities rather than a high concentration which creates the marked effect on the measured dielectric constant. For similar reasons, other conducting inorganic colloidal impurities such as barite could produce an analogous result if they are present.

Further objects and advantages of the present invention will become apparent from the following description of the drawings which are incorporated herein and made a part of this specification.

Figure 4:
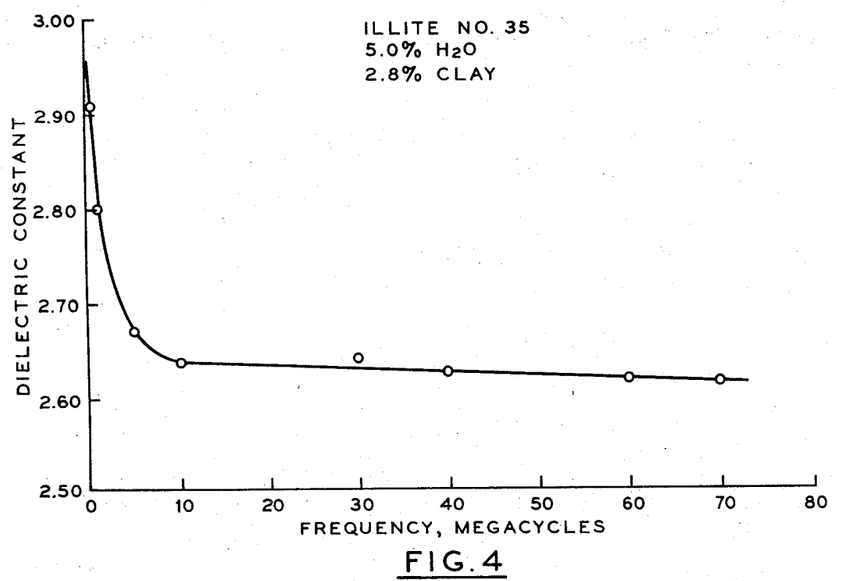
FIG. 4 is a graph showing the dielectric dispersion as a function of frequency of 2.8 percent illite clay and 5 percent water in pure white oil.
Figure 5:
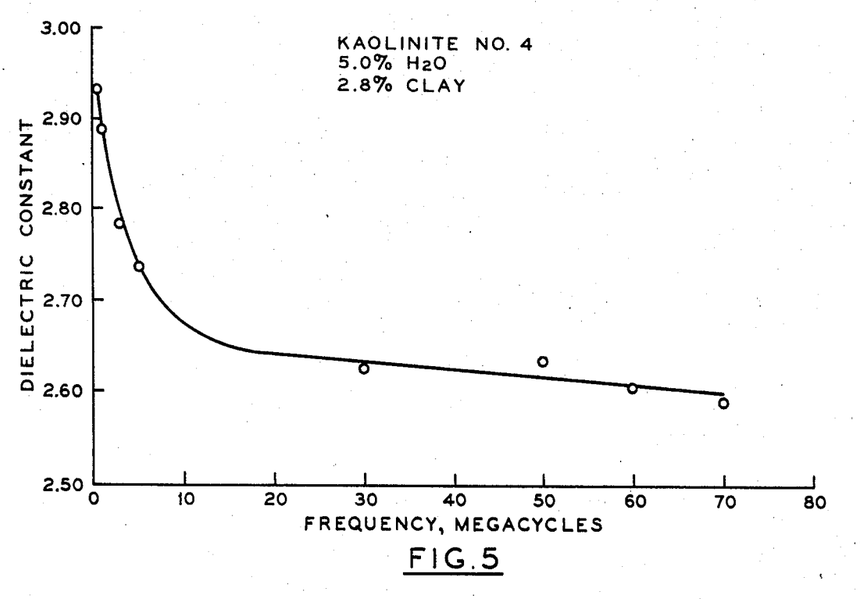
FIG. 5 is a graph showing the dielectric dispersion as a function of frequency of 2.8 percent kaolinite clay and 5 percent water in pure white oil.
Figure 6:
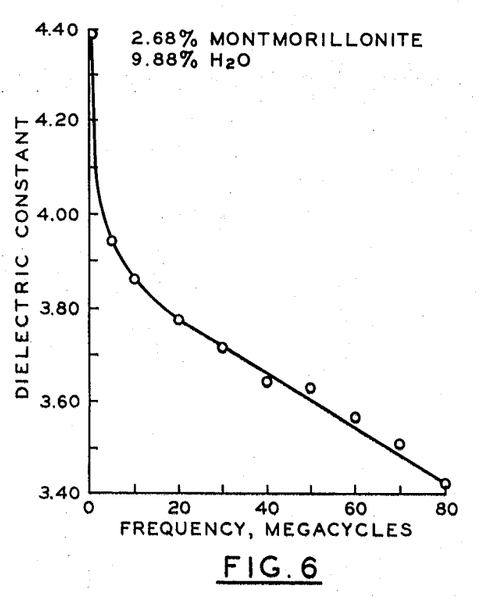
FIG. 6 is a graph showing the dielectric dispersion as a function of frequency of 2.68 percent montmorillonite clay and 9.88 percent water in pure white oil.

There is an apparent variation in the susceptibility of different types of minerals to interfering with the measurement of the dielectric constant. FIGS. 4, 5 and 6 show the dependence of the measured dielectric constant on frequency for three clays: illite, kaolinite and montmorillonite. Illite shows little dispersion above 10 megahertz, kaolinite shows little dispersion above 30 megahertz, but montmorillonite shows a great deal of dispersion up to at least 80 megahertz. All show significant dispersion at frequencies below 10 megahertz.

Contrary to the experimental results obtained by the present inventor, some authors have reported that the measured dielectric constant of crude petroleum is not frequency-dependent in the 1 to 10 megahertz range. See Warren, W. J., Journal of Petroleum Technology, 14, 1207 (1962). In the series of experiments reported in Table II, the dielectric constant of crude oils from a number of locations was measured by a capacitance probe operating at 10 megahertz and subsequently by a probe operating at 100 megahertz. A sample of each crude was centrifuged to determine the exact amount of water-in-oil. The results clearly indicated the frequency-dependence of the measured dielectric constant and also indicated that much more accurate measurements could be made at 100 megahertz.

TABLE II

| Crude Oil | 10 MHz Value | 100 MHz Value | Centrifuge Value |
|---|---|---|---|
| Flatlake | 5.2 | 0 | 0 |
| W. Fairfield, Texas | 5.2 | 0 | 0 |
| Bantry-Manville | 6.0 | 1.2 | 1.0 |
| Ayoluengo, Spain | 1.0 | 0 | Trace |
| Dead Horse Creek | 2.0 | 0 | 0 |
| Baldwin A | 5.5 | 0 | Trace |
| Caprizo Wilcox | 4.0 | 0 | 0 |
| Murphy-Whittier A | 5.5 | 0 | 0 |
| Murphy-Whittier B | 5.5 | 0 | 0.5 |
| Libya, Oasis | 3.0 | 0 | 0.2 |
| Libya, Amin | 4.7 | 0 | 0 |
| Kelly-Snyder | 0.2 | 0 | 0 |
| Baldwin B | 5.5 | 0 | 0.5 |
| Baldwin C | 6.5 | 1.5 | 1.5 |
| Baldwin D | 10.2 | 4.5 | 6.0 |
| Murphy-Whittier C | 36.0 | 31.5 | 31.5 |
| Las Flores | 49.0 | 44.5 | 43.0 |
| Casmalia | 6.7 | 0.2 | 0 |
| Belmont Offshore | 5.5 | 0 | 0.5 |
| SACS | 9.5 | 1.5 | 3.0 |
| Monte Cristo A | 6.5 | 0 | 1.0 |
| Monte Cristo B | 7.0 | 0.5 | 1.5 |
| Huntington Beach A | 21.0 | 17.0 | 20.0 |
| Mt. Diablo | 6.0 | 0 | 1.0 |
| Surfside | 5.5 | 0 | Trace |
| Swanson River | 2.0 | 0 | Trace |
| Cymric | 4.5 | 0 | 0 |
| Huntington Beach B | 14.0 | 7.5 | 8.5 |
| Tognazini | 14.5 | 7.8 | 8.2 |
| Boscan | 8.0 | 1.5 | Trace |

| | | | |
|---|---|---|---|
| Huntington Beach C | 27.0 | 25.0 | 23.5 |
| Patterson Ranch | 8.7 | 0.5 | 0.5 |
| McPhee | 8.5 | 18. | 2.0 |

Only one sample out of about 50 showed no appreciable dispersion at 10 megahertz. The percentage of water was calculated in accordance with the following formula:

$$V_{water} = 1 - [(\epsilon_w - \epsilon)/(\epsilon_w - \epsilon_0)] (\epsilon_0/\epsilon)^{1/3}$$

where
$\epsilon$ = measured dielectric constant
$\epsilon_w$ = real part of the dielectric constant of water = 79
$\epsilon_0$ = dielectric constant of crude oil ≈ 2.30

The above results are attributed to the avoidance at the higher frequency of the conductivity effects of conducting impurities. When the organic colloidal impurities were precipitated out of two oil samples with the use of pentane, dielectric dispersion was eliminated and a lower value for the dielectric constant was obtained.

Figure 3:
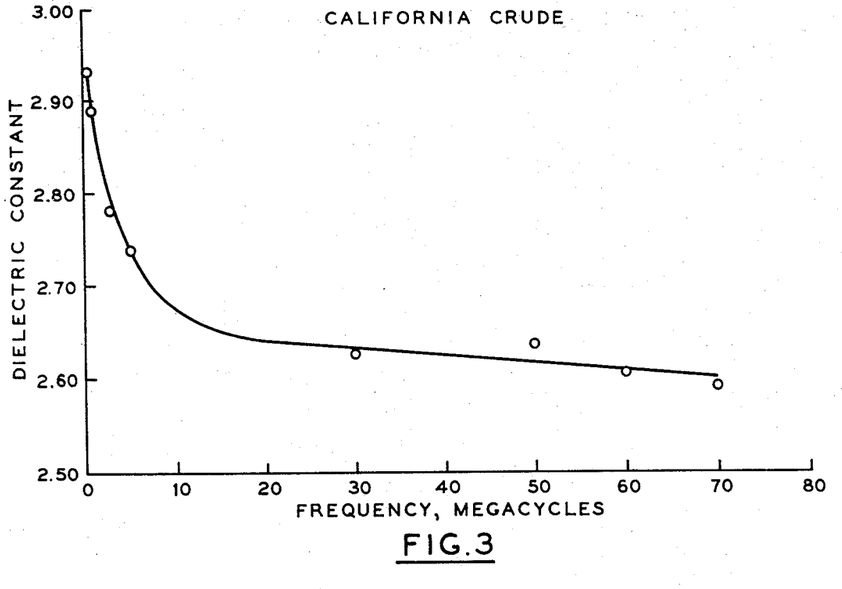
FIG. 3 is a graph illustrating the dielectric dispersion as a function of frequency of a California crude oil.

A similar indication of the frequency dependence of the measured dielectric constant is illustrated in FIG. 3 in which the measured dielectric constant of a California crude is plotted versus frequency. Again, it is clear that there is a frequency dependence and that it is desirable to definitely avoid the 1 to 10 megacycle range and operate at a frequency where conductive effects are substantially avoided, say, at frequencies above 10 megacycles and preferably above 50 megacycles.

A specific example of the operability and utility of the method of the present invention can be obtained by reference to the petroleum industry. Crude oil is nearly always extracted from the ground as a water-in-oil emulsion. For processing purposes, the water is a contaminant and it is both desirable to know with accuracy the amount of water present in the oil and to eliminate it. Also, crude oil, once processed, is often stored with water in tanks and it is desirable to know the location of the interface. And crude oil is often either transported in pipelines which are cleaned by water-flushing or in which water is used as a separator between batches of crude oil; in these pipelines the detection of water-oil fractions is used in the oil industry to determine whether a pipeline or a refinery should accept a given batch of crude oil; if the water content is too high the batch is not accepted. In one field situation a batch of crude oil which would normally have been accepted by a pipeline was continuously being recycled. A sample of the batch was removed and significant dielectric dispersion was detected. A sample was subsequently taken from a batch which was being accepted by the same pipeline. This subsequent sample showed much less dielectric dispersion.

If where no dispersion, the measurement of the dielectric constant of the water-in-oil emulsion would be an adequate means of differentiating between the presence of oil and water. Pure oils typically have a dielectric constant on the order of 2, while water has a dielectric constant on the order of 79. If no conducting impurities were present or if there were no losses due to the friction of water dipoles, the composite measured dielectric constant would reflect the amounts of oil and water present. Thus, the measured dielectric constant could be used to determine the percentage of water and the percentage of oil. However, the presence of conducting impurities and the existence of losses due to water dipole friction makes it impossible to accurately measure the fraction of water and the fraction of oil. Inaccurate dielectric constant measurements made in water-in-oil emulsions have resulted in inaccurate ascertainment of water to oil ratios which have resulted in too much water being present in the mix delivered to refineries, or which have resulted in overpayment of royalties to landowners or governmental entities that are supposedly paid a royalty on the volume of crude oil, not on the volume of the water-in-oil emulsion, extracted from their land. Pipeline control valves have failed to react to changes in the composition of the crude oil emulsion; typically, they can detect gross changes such as a change from water to water-in-oil, but they cannot pick up gradual or slow changes in the water content of water-in-oil emulsions, say, for example, from a two percent to a three percent mixture of water in oil. This insensitivity to small changes is due to the overwhelming influence of the conducting inorganic colloidal impurities, such as clay particles, on the measured composite dielectric constant when the impurities are present.

Figure 1:
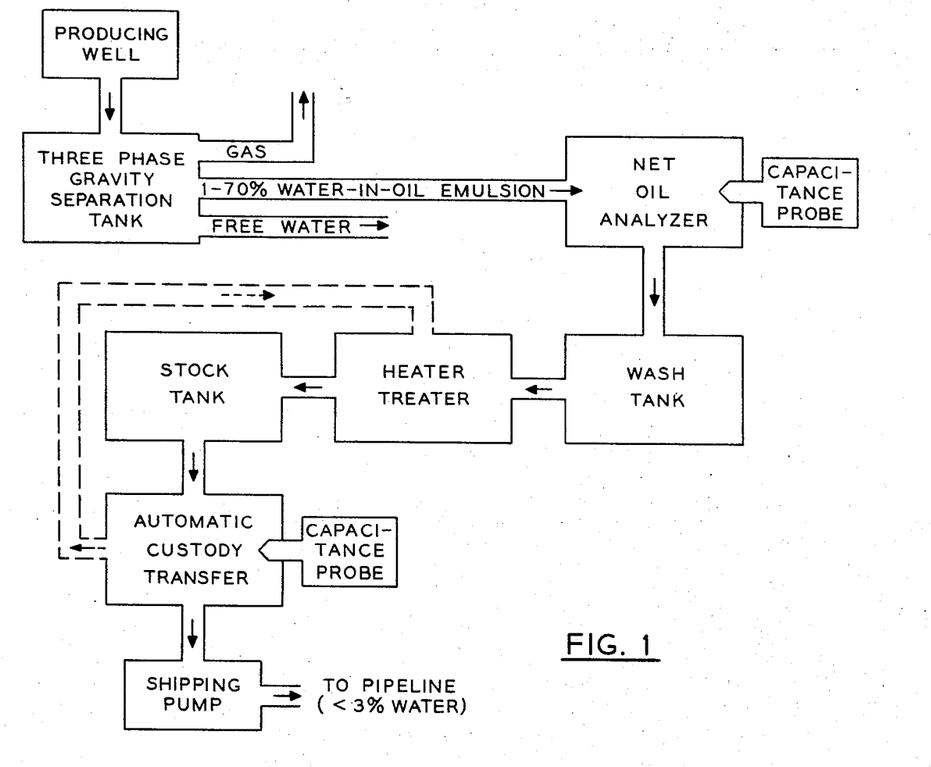
FIG. 1 is a flow diagram illustrating an application of the present invention wherein capacitance probes are utilized in a completely automated oil field operation.

A more detailed understanding of the use of capacitance measuring probes in the oil industry can be had by reference to FIG. 1, a schematic flow diagram of an automated oil field well-to-pipeline operation. Crude oil is pumped directly to a gravity separation tank where it resides for a specified period of time. Natural gas is extracted from the top of the tank, free water from the bottom and a water-in-oil emulsion from the middle. Interface control in the tank is maintained by electronic or floating means so that only the desired water-in-oil emulsion is fed into the flow of the system. The emulsion typically contains from one to 70 percent water. The emulsion is fed into a net oil analyzer, a vessel in which a capacitance probe is operating. The electrical output of the probe, if it functions properly, is a measure of the amount of oil present and is used to calculate royalty payments.

As shown in FIG. 1 the emulsion is next fed into a wash tank where de-emulsifiers are added and where further gravity separation may occur. The emulsion is next fed into a heater treater which further breaks down the emulsion by heating. If the volume of oil produced is not great enough to be fed directly into a transportion pipeline the emulsion may then be stored in a stock tank. Finally, when a sufficient volume is accumulated, the stock is fed to an automatic custody transfer unit which will transfer it to the pipeline if less then a specified amount of water is present. The determination of the water/oil fraction is made by a capacitance probe. If more than the specified amount of water, say three percent, is present, the stock is recirculated to the heater treater; if the shipping criterion, say three percent, is met, the stock is fed to the pipeline. The amount of oil shipped is tabulated by a positive displacement meter. Samples of the oil being transferred to the pipeline are constantly being taken so that a centrifuge test check can be made on the water/oil fraction. This last procedure reflects the distrust of commercially availabe capacitance probes and points out the need for a reliable capacitance measuring method. Centrifuge checks are time consuming and unwieldy whereas a reliable capacitance measuring method will operate without human intervention.

Figure 2:
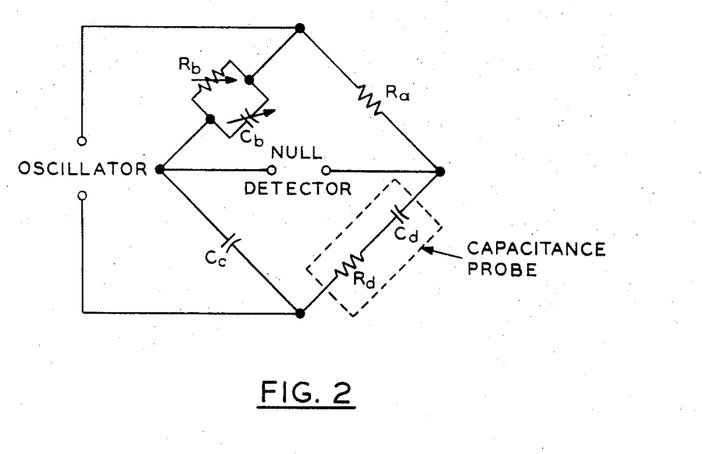
FIG. 2 is a schematic diagram of a capacitance probe circuit which can be used to practice the method of my invention.

Resonance circuits with a vacuum-tube voltmeter readout are typically employed to drive the standard capacitance probe with which this invention is practiced. Ample description of five types of suitable resonance circuits may be found in Dielectric Materials and Their Applications, A. Von Hippel, ed., at pp. 58–62. Null methods embodying resistive and capacitance-arm bridges are less desirable in the 10 to 300 megahertz range due to the residual impedances encountered in the peripheral elements of any circuit. FIG. 2 is a schematic illustration of a bridge circuit. When the capacitance probe is inserted in the test medium an unknown impedance consisting of resistance $R_d$ and capacitance $C_d$ is introduced into the circuit. When variable resistance $R_b$ and variable capacitance $C_b$ are matched to the capacitance probe impedance a null is detected across the bridge and the capacitance of the test medium is thereby determined. A further and acceptable measuring circuit can be devised utilizing transmission line measurements described fully in Von Hippel, supra, at pp. 63–70.

MODIFICATION

Figures 7, 9:
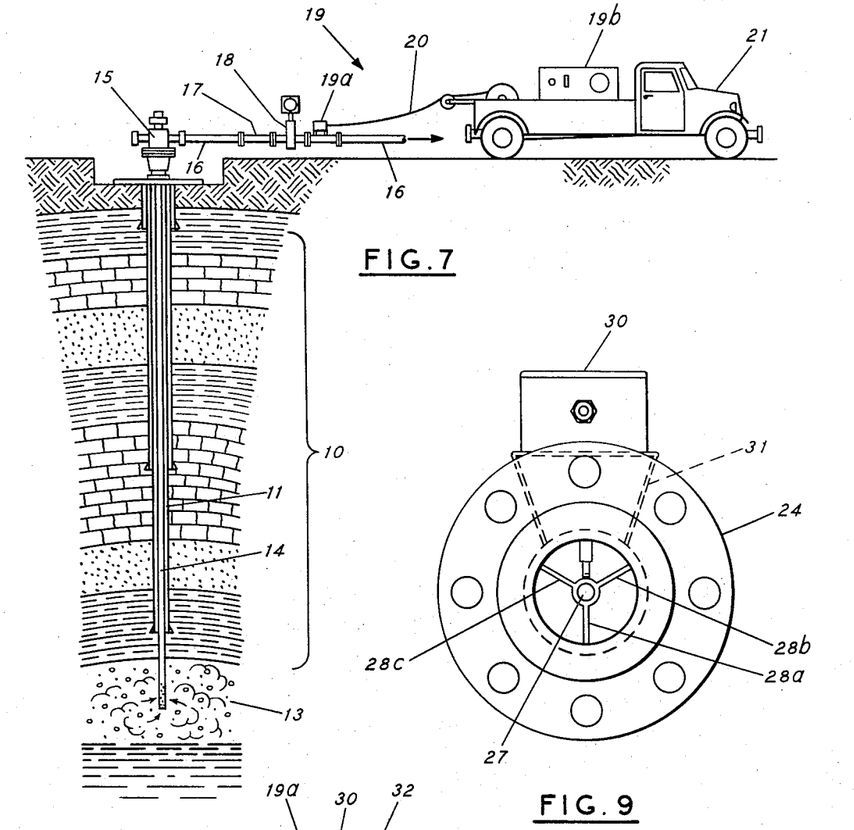
FIG. 7 is a side elevation of a producing gas well wherein the present invention is utilized to monitor water content of the gas stream flowing from the wellhead through associated piping adjacent the well site.
FIG. 9 is a section taken along 9—9 of FIG. 8.

A second example of the operability and utility of the method of the present invention can be seen by reference to FIG. 7, showing an earth formation 10 penetrated by a well bore 11. The well bore 11 is seen to terminate in producing within an oil-gas producing strata 13. Gas within the strata 13 flows in an upward direction from the strata 13 along production string 14 to the wellhead 15. Transversed to wellhead 15 is a gather line 16 within which is afixed choke 17, an oriface meter 18 and a capacitance probe gas stream meter 19. Gas stream meter 19 includes a coaxial cell 19a through which the gas stream passes as capacitive measurements are taken. A cable 20 connects between the cell 19a and sensitive signal demodulating equipment 19b located within a truck 21.

Characteristics of the Gas Stream: The gas stream within the gather line 16 includes a water saturated vapor phase within which are dispersed droplets comprising condensed oil and water. These droplets represent the discontinuous phase, while the vapor is the continuous phase. Accordingly, for purposes of this application, the term "natural gas stream" is to be defined as a multiphase aerosol stream consisting of a continuous vapor phase within which is dispersed a discontinuous liquid phase comprising droplets of condensed oil and water. It is possible that these liquid droplets may form, in some part, an oil-in-water emulsion, although at particular points within the stream, the droplets may also be discretely positioned with respect to one another. Their size also varies as a function of the wellhead conditions such as temperature, pressure and flow rate of the stream, and the effects of their size and shape may produce dispersive effects along with clay constituents, if any, on the measured dielectric constant of the stream. Although a relatively low fraction of the total stream, the percentage of water per unit volume of gas stream within gather line 16 is nevertheless a useful statistic: in Canada, the Alberta Oil and Gas Conservation Board, e.g., has requested that gas field operators monitor water, condensate and gas flow rates at each producing well. Although separators could be installed at each well site, the cost is exceedingly high, up to approximately $50,000 per well. The purpose of the gas stream meter 19 of the present invention is to determine the percentage of water within the multiphase natural gas stream as a function of the unit volume at each wellhead.

Figure 8:
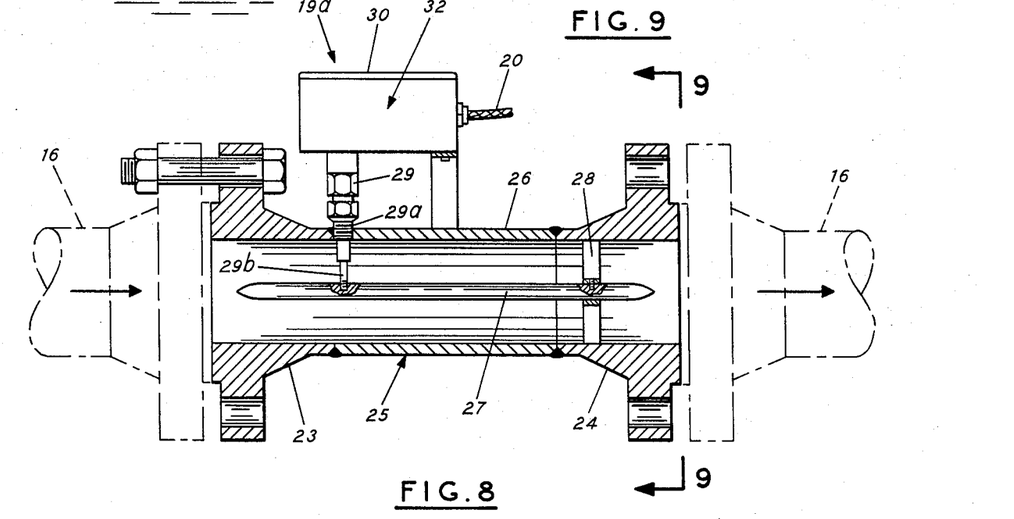
FIG. 8 is a side elevation partially cut away of a capacitive probe cell utilized in the associated piping of the producing well of FIG. 7.

Refer now to FIG. 8 where the coaxial cell 19a within gather line 16 is shown in detail. Cell 19a is seen to include flanged connectors 23 and 24 welded to an intermediate straight piping section 25. Side walls of the connectors 23 and 24 and pipe section 25 are aligned so that inner side wall 26 of the cell is continuous and concentric of the axis of symmetry of the cell. Also concentric of the axis of symmetry is a rod-like sensor 27 forming one element of the capacitive probe unit of the present invention. Sensor 27 is seen to extend nearly the entire length of the cell and is supported at one end by a spider support 28. Arms 28a, 28b and 28c of the support 28 radially extend outward to contact the side wall 26 of the cell (See FIG. 9). At the other end, the sensor 27 is unsupported other than by means of coaxial connector 29. Connector 29 has an outer conductor 29a in both mechanical and electrical contact with the pipe section 25 and an insulated inner conductor 29b in direct contact with the sensor 27. At its other end, connector 29 is terminated in mechanical contact with junction box 30. Support of the junction box 30 relative to the section 25 is by upright platform 31 (See FIG. 9) mounted to the exterior of side wall 26. The junction box 30 is thermally insulated to provide a stable temperature environment for the operation of a sensor oscillator unit generally indicated at 32, at its interior and described in detail below. In the detection of capacitive change, the water content of the toroidal volume of the gas stream between the sensor 27 and the coexisting interior surface of side wall 26 in the "active" region of the cell, becomes critical. In this regard, the total capacitance ($C_P$) developed between the two elements of the capacitive probe, i.e., the sensor 27 and the coexisting segment of side wall 26 parallel to sensor 27, is equal to $C_P = C_o + \epsilon C_c$ where $C_o$ is the stray capacitance of the cell, $\epsilon$ is a dielectric constant of the gas stream and, $C_c$ is the capacitance of the active portion of the cell when empty.

It should be noted that the dielectric constant is not related to the water content of the stream alone but instead is related to the gas stream in toto. Although the mathematical relationship between the water, gas and condensate of a gas stream can be calculated by formula, in a manner similar to that previously described, calibration techniques, well understood in the art, can also be used. Usually in such techniques, the change in the dielectric constant, due to water content are monitored after normalization for the other constituents of the stream has occurred.

The dielectric constant change—and hence percentage water content—will be indicated by the relative change in capacitance between the sensor 27 and the coextending side wall 26 of the cell.

Operation of the sensor oscillator circuit 32: In order to convert changes in cell capacitance to corresponding electrical signals, a resonance circuit (which includes a sensor oscillator of the stable Clapp type) drives the capacitive probe of the present invention through a precision RLC circuit at a preselected elevated frequency in the range of 40–300 megahertz. In accordance with the present aspect of the invention, the sensor 27 serves as a resonating capacitor in such resonating circuit whereby changes in capacitance of the probe due to passing water cause a shift in frequency of the Clapp oscillator in circuit with the sensor. The generated variable frequency signal indicative of the frequency shift is then transmitted via cable 20 to demodulating and indicating circuitry designated 19b in FIG. 1 where frequency-to-voltage conversion of the variable frequency signal occurs. It should be noted that the sensor oscillator circuit 32 located within the junction box 30 is placed in close physical contact with the capacitor probe of the present invention so as to reduce stray and lumped capacitance of the system. In this regard, the lumped capacitance of the resonance circuit due primarily to the sensor 27 is relatively low, say between 50 to 100 pfd so that changes of less than 1 pfd can be detected.

Figure 10:
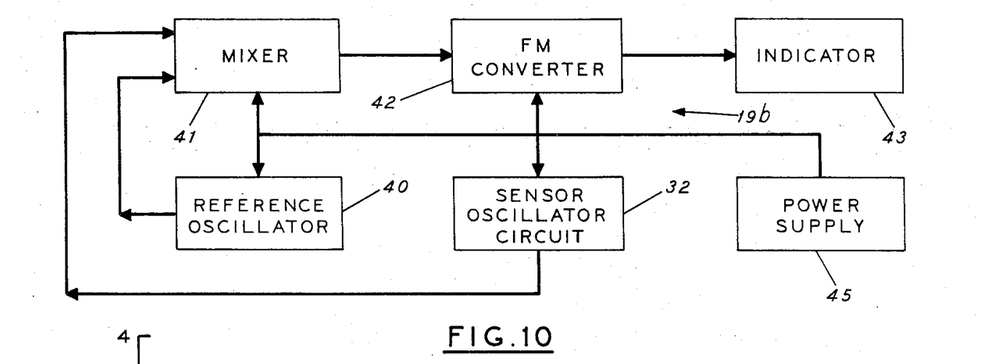
FIG. 10 is a block diagram for an electrical circuit for converting changes in capacitance within the cell of FIGS. 8 and 9 to signals representative of the percentage of water within the total gas stream after calibration.

Demodulation within Demodulating Circuit 19b: As shown in FIG. 10, after the variable frequency signal has been generated, a fixed frequency signal from fixed reference oscillator circuit 40 is compared therewith in a mixer 41. The fixed frequency signal generated by the reference oscillator circuit 40 is seen to be shunting the sensor oscillator circuit 32. The mixer 41 and reference oscillator circuit 41 are tailored to work within the frequency range of interest, that is within the frequency range of 40 to 300 megahertz. The difference frequency signal of mixer 41 is then converted to a direct current voltage by FM converter 42 in series with the mixer. The resulting signal is then indicated by means of indicator 43, such as a digital voltmeter. Indicator 43 also meters the output of the FM converter 42 so as to set the resonance circuit of the sensor oscillator circuit 32 at the proper position on the response curve of the converter 42.

FM converter 42 basically utilizes an off-the-shelf conventional FM receiver modified to accommodate mixer 41 and indicator 43. Conventionally such FM receivers include a three-stage IF amplifier in series with an FM discriminator of a ratio detector type. The output of the converter 42 is usually metered so that output to the indicator is in the range of 0 to 3 volts across a high range resister.

Energization of the FM converter 42, the mixer 41, the reference oscillator 40, as well as the sensor oscillator circuit 32 is by means of power supply 45. It can be operated on 110 volt /60 cycle AC line or by means of a multi-volt battery.

Operating frequencies of the gas stream meter can be, as previously indicated, in a range of 40–300 MHz. However, because of a variety of conditions including field problems of using the meter with a flowing gas stream (Flow rates: min: 3 × 10⁶ standard ft.³/ da) as well as manufacturing considerations, a frequency range of operations of about 40 MHz to 100 MHz, is preferred.

DEMONSTRATION

Manufacture and testing of the gas stream meter 19 of the present invention having the following dimensions, circuit element type and operating specifications, has been successfully completed by the asignee of the present invention.

| ELEMENT | Dimensions, type size or specifications |
|---|---|
| Cell 19a | |
| Sensitivity | Δ3 pf = 2% water content/unit volume of stream under field conditions |
| Operating Frequency | 40–100 MHz. |
| Flanged Connector 23, 24 | 3" O.D. × 3½" Lg. |
| Section 25 | 3" O.D. × 6" Lg. |
| Side Wall 26 | 3" O.D. × 13" Lg. |
| Sensor 27 | ½" O.D. × 12" Lg. |
| Connector 29 | 2500 psi; 9 mm, 2000 V, 300°–500°F |
| Junction Box 30 | 3" × 3" × 5" Lg. |

DEMODULATING CIRCUIT 19b

Figure 12:
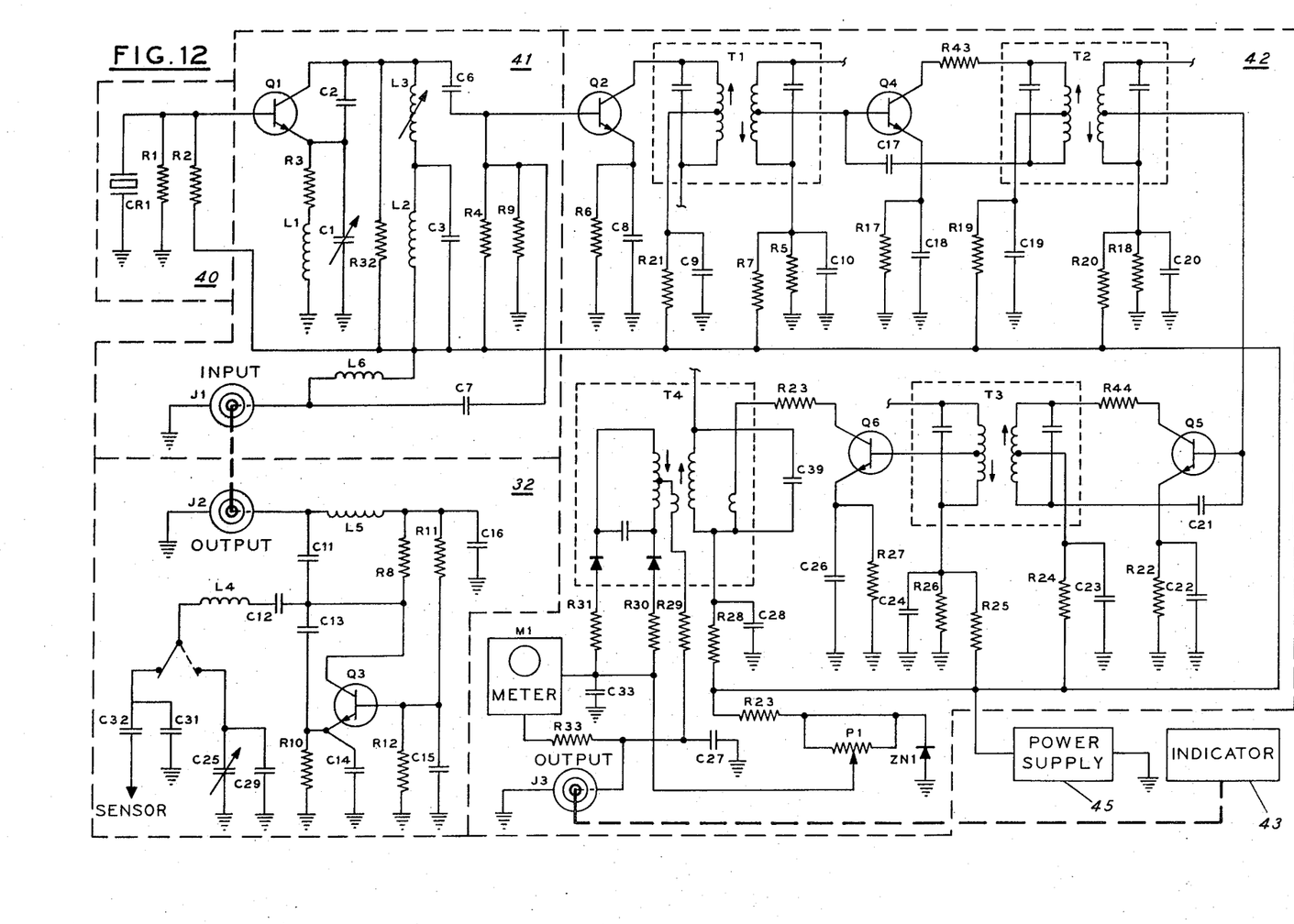
FIG. 12 is a detailed circuit diagram of the circuit of FIG. 10.

SENSOR OSCILLATOR CIRCUIT 32 (legend key: FIG. 12)

| | |
|---|---|
| CR1 | 50 MHZ Crystal |
| RY1 | Feed Relay (Mercury Wetted) |
| S1 | Toggle Switch |
| T1 | Transformer |
| T2 | Transformer |
| T3 | Transformer |
| T4 | Transformer |
| ZN1 | Zener Diode |
| C1 | Trimmer Condenser |
| C2 | 39μμfd Mica Condenser |
| C3 | 0.001μfd Condenser |
| C12 | do. |
| C16 | do. |
| C17 | do. |
| C6 | 0.5μμfd Condenser |
| C7 | 100μμfd Mica Condenser |
| C8 | 0.0056μfd Condenser |
| C18 | do. |
| C22 | do. |
| C25 | do. |
| C9 | 0.02μfd Ceramic Condenser |
| C10 | 0.005μfd Ceramic Condenser |
| C20 | do. |
| C23 | do. |
| C24 | do. |
| C26 | do. |
| C11 | 5μμfd Condenser |
| C39 | do. |
| C13 | 150μμfd Mica Condenser |
| C14 | do. |
| C15 | 750μμfd Mica Condenser |
| C16 | do. |
| C17 | 5μμfd Mica Condenser |
| C21 | do. |
| C27 | 2μfd Mylar Condenser |
| C28 | 2.3–14.2μμfd Condenser |
| C29 | 10μμfd Condenser |
| F1 | ⅜ A. Fuse (S10-B10) |
| J1 | Cable Sockets |
| J2 | do. |
| J3 | do. |
| L1 | 10μh Choke |
| L2 | do. |
| L3 | 0.22μh Choke |
| L4 | 12 Turns No. 14 Tinned Bus Bar Wire on Steatite Coil Form. Coil Length 1 inch |
| L5 | 560μh Choke |
| L6 | do. |
| M1 | Phaostron 50-0-50μA Meter |
| N1 | Neon Pilot Light |
| P1 | 1KΩ Helipot |
| PL1 | Grounding 110V Power Plug |
| PS1 | Regulated Supply |
| Q1 | NPN Transistors |
| Q2 | do. |
| Q3 | do. |
| Q4 | do. |
| Q5 | do. |
| Q6 | do. |
| C31 | 15pf Condenser |
| C32 | 5pf Condenser |
| C33 | 90μf Condenser |
| R1 | 4.9K Resistor |
| R2 | 15K Resistor |
| R11 | do. |
| R3 | 499Ω Resistor |
| R9 | do. |
| R4 | 12K ¼w Carbon Resistor |
| R5 | 4.7K ¼w Carbon Resistor |
| R6 | 1.1K ¼w Carbon Resistor |
| R7 | 6.8K ¼w Carbon Resistor |
| R19 | do. |
| R25 | do. |
| R8 | 2.7K ¼w Carbon Resistor |
| R20 | do. |
| R26 | do. |
| R10 | 250Ω Resistor |
| R12 | 200Ω Resistor |
| R17 | 1.5K ¼w Carbon Resistor |
| R22 | do. |
| R27 | do. |
| R18 | 2.2K ¼w Carbon Resistor |
| R24 | do. |
| R28 | do. |
| R21 | 470Ω ¼w Carbon Resistor |
| R23 | 100Ω ¼w Carbon Resistor |

| | | |
|---|---|---|
| R29 | do. | |
| R44 | do. | |
| R30 | 8.2K ¼w Carbon Resistor | |
| R31 | do. | |
| R32 | 30K Precision Resistor | |
| R33 | 500Ω Precision Resistor | |
| R43 | 330Ω ⅛w Carbon Resistor | |

TESTS

On a sampling loop of a test gas well at Watonga, Oklahoma, the gas stream meter 19 of the present invention was successfully tested by a test-and-compare analysis. The loop included an oriface meter and an external water injection pumping system operative to accurately meter known percentages of water (Units: $\%H_2O$ per unit volume) past the meter 19.

After calibration of the meter 19 at zero water injection under field gas stream conditions (typical field conditions: pressure range, 800 to 1,000 psig; flow rate stream, 3–5 million cubic feet per day; velocity range, 15–25 feet per second), the pumping system was activated to meter water past the gas meter 19, such water being accurately measured as a percentage of a unit volume of stream at the test site. The results of the test-and-comparison analysis are set forth below as well as being plotted in FIG. 11.

| Injection % Water Per Unit Volume of Stream | Indicator Voltage of Meter 19 | Calculated % Water Per Unit Volume of Stream |
|---|---|---|
| Run 1 | | |
| 0 | 0.26 | 0 |
| 0.50 | 0.52 | 0.52 |
| 0.83 | 0.72 | 0.84 |
| 1.02 | 1.20 | 1.40 |
| 2.00 | 1.74 | 2.00 |
| 2.80 | 2.44 | 2.80 |
| 3.25 | 2.68 | 3.20 |
| Run 2 | | |
| 0 | 0.32 | 0 |
| 0.34 | 0.47 | 0.34 |
| 0.71 | 0.70 | 0.70 |
| 0.72 | 0.68 | 0.72 |
| 1.53 | 1.24 | 1.52 |
| 1.73 | 1.40 | 1.72 |
| 1.90 | 1.62 | 1.90 |
| 1.95 | 1.70 | 1.94 |
| 2.24 | 1.88 | 2.28 |
| 2.25 | 1.88 | 2.27 |
| 2.53 | 2.28 | 2.52 |
| 3.20 | 2.68 | 3.20 |
| 3.40 | 2.70 | 3.40 |

Figure 11:
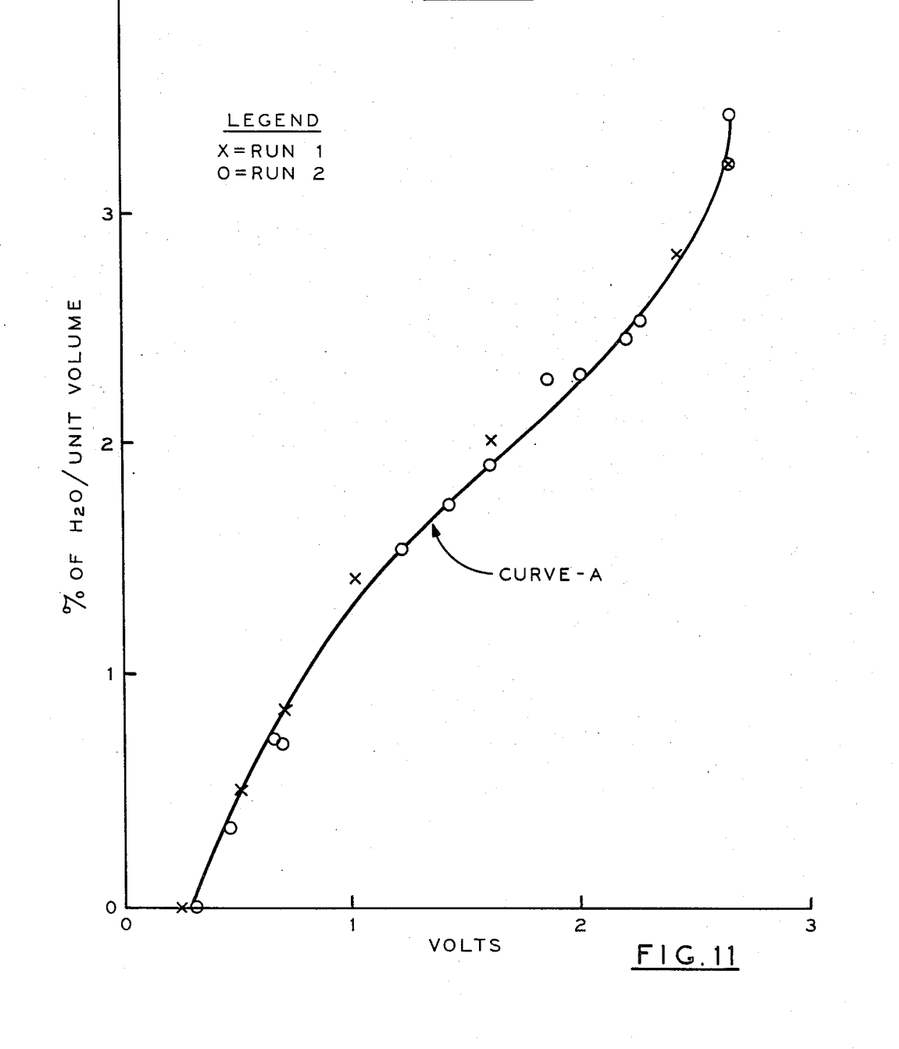
FIG. 11 is a graph showing the relationship between percentage flow of water per unit volume as a function of voltage for a test gas stream under actual field conditions in which known percentages of water were injected and checked by the method of the present invention.

Curve A of FIG. 11 is a composite of Runs 1 and 2 and is seen to have the familiar "S" shape response characteristic of a discriminator. Repeatability of dependent and independent variables (i.e., voltage vs. percent of water per unit stream volume) is also indicated by the overlapping of the plotted results even though the water was in both liquid and vapor phases and the flow rate was at least $3 \times 10^6$ standard ft.³/da. Note that the independent and dependent variables depicted in FIG. 11 is in terms of percent of unit volume of the actual stream as constituted and not normalized to standard conditions. At standard conditions, a typical gas stream may contain roughly 100 barrels of oil condensate per million cubic feet of dry gas under standard operating conditions of one atmosphere and 60° F. Similarly, the amount of water can be roughly 1 to 2 barrels per million cubic feet of dry gas under standard conditions.

Experience has also indicated that the water content of gas streams from gas wells in Canada's Kaybob South Field, having the following operating parameters, can be accurately determined using the gas meter 19 of the present invention even though the water is biphasal and flows at a minimum rate of $3 \times 10^6$ ft³/da.

Gas Flow Rates
  Min.: 3 million standard cubic feet per day
  Avg.: 20 million standard cubic feet per day
  Max.: 40 million standard cubic feet per day
Stream Flow Temperatures at Test Site
  Avg.: 100° F.
  Max.: 120° F.
Line Pressure at Test Site
  Avg.: 12–1,300 psig
  Max.: 12–1,700 psig Kaybob's natural gas stream is characterized by a continuous vapor phase saturated with water vapor in which there is also dispersed condensate (oil) and water which form a discontinous liquid phase. Experience has indicated the apparatus and method of the present invention is surprisingly accurate in the determination of water content of such streams which have a percentage constituency per unit volume as set forth in Table I.

TABLE I

| Continuous Gas Phase | % | Discontinuous Phase or Dispersed Phase | % |
|---|---|---|---|
| | | Condensate (Oil Droplets) | |
| $H_2S$ | 20.0 | $H_2S$ | 20 |
| Methane | 65.0 | Methane | 20 |
| Ethane | 7.0 | Ethane | 6 |
| Propane | 3.0 | Propane | 5 |
| $CO_2$ | 3.5 | Higher Mol. Wt. | 40 |
| Nitrogen | 1.0 | Other | 9 |
| Other | 0.05 | | |

Note in this regard that in the Kaybob Field the concentration of water per unit stream volume can be quite low, say within a maximum range of 0.05 to 10% water per unit volume, with a range of 0.1 to 6% water more usual than not.

While specific embodiments have been presented in the specification and drawings, it is evident that many other embodiments are feasible and it is intended that Letters Patent covering the invention herein be only limited to the scope and spirit of the appended claims.

What is claimed is:

1. Apparatus for measuring with greater accuracy water content of a multiphase gas stream flowing from a wellhead through a conduit such as a gather line in which the effects due to dispersion and/or water absorption in said gas stream as measurements occur, are minimized, comprising

*i.* a capacitance probe in contact with said gas stream including first and second spaced-apart capacitive elements, said first element being an elongated sensor rod positioned within but electrically isolated relative to said conduit,

*ii.* resonance circuit means including cooperative sensor oscillator means in circuit with said capacitance probe adapted to drive said capacitive probe at a frequency within a range of 40–300 MHz, said resonance circuit means generating a variable frequency signal whose change in frequency is indicative of the real part of the dielectric constant of said gas stream flowing between said first and second capacitive elements,

*iii.* reference oscillator means for generating a fixed frequency signal,

*iv.* mixing means in circuit with said circuit means and said resonance oscillator means for simultaneously comparing said generated variable frequency signal and said fixed frequency signal and thereafter generating a difference frequency signal, v. means in series with said mixing means for converting said generated frequency difference signal to an electrical signal indicative of said real part of the dielectric constant of said gas stream so as to accurately indicate said water content of said gas stream without error being introduced by said dispersion and/or absorption effects of said gas stream.

2. The apparatus of claim 1 in which said reference oscillator means is tuned to generate said fixed frequency signal at a selected frequency in a frequency range of 40–300 MHz.

3. The apparatus of claim 1 in which said last-mentioned conversion means comprises a serially connected amplifier and FM discriminator of the ratio detector type.

4. The apparatus of claim 3 with the addition of a digital voltmeter in series with said FM discriminator for indicating said real part of said dielectric constant.

5. The method of measuring more accurately low concentrations of water in a multiphase natural gas stream flowing from a wellhead through a conduit such as a gather line by determining the real part of the complex dielectric constant of said natural gas stream by minimizing the adverse effects due to dispersion and/or water absorption as measurements occur, which comprises the steps of:

i. inserting a capacitance probe into said natural gas stream,
  ii. driving said capacitance probe by an alternating current circuit at a frequency within the range of from 40 to 300 MHz,
  iii. measuring the capacitance of said capacitance probe and
  iv. calculating the real part of the complex dielectric constant of said gas stream.

6. The method of claim 5 wherein said capacitance probe is driven by an alternating current circuit within a frequency having a range of 40 to 100 MHz.

7. The method of claim 5 wherein said measured water content within said gas stream is in both a liquid and a gas phase and is at concentrations of less than 10 percent per unit volume of said gas stream.

8. The method of claim 7 wherein the concentration of said water is less than 6 percent per unit volume of said gas stream.

* * * * *